(12) United States Patent
Huang (10) Patent No.: US 7,446,445 B2
(45) Date of Patent: Nov. 4, 2008

(54) VIBRATION MOTORS AND ELECTRONIC DEVICES UTILIZING THE SAME

(75) Inventor: Chih-Lung Huang, Taipei (TW)

(73) Assignee: Qisda Corporation, Taoyuan County (TW)

( * ) Notice: Subject to any disclaimer, the term of this patent is extended or adjusted under 35 U.S.C. 154(b) by 364 days.

(21) Appl. No.: 11/117,035

(22) Filed: Apr. 28, 2005

(65) Prior Publication Data

US 2005/0242672 A1    Nov. 3, 2005

(30) Foreign Application Priority Data

Apr. 30, 2004   (TW)   ............... 93112162 A (51) Int. Cl.
*H02K 7/065*   (2006.01)
*H02K 33/00*   (2006.01)
*H02K 33/18*   (2006.01)

(52) U.S. Cl. .................................. 310/81; 310/36

(58) Field of Classification Search ............. 310/36–37, 310/81
See application file for complete search history.

(56) References Cited

U.S. PATENT DOCUMENTS

| | | | | |
|---|---|---|---|---|
| 5,471,103 A * | 11/1995 | Fujii | ........................... | 310/81 |
| 5,942,833 A * | 8/1999 | Yamaguchi | ................. | 310/268 |
| 6,011,333 A * | 1/2000 | Yamaguchi et al. | ........... | 310/81 |
| 6,246,143 B1 * | 6/2001 | Yamaguchi | ................. | 310/233 |
| 6,365,995 B1 * | 4/2002 | Fukuda et al. | ................ | 310/81 |
| 6,628,025 B2 * | 9/2003 | Ibata et al. | .................... | 310/81 |
| 6,919,655 B1 * | 7/2005 | Jao | ............................. | 310/36 |
| 6,998,742 B2 * | 2/2006 | Yamaguchi et al. | ........... | 310/81 |

* cited by examiner

*Primary Examiner*—Burton Mullins (57) ABSTRACT

A vibration motor and an electronic device utilizing the same. The vibration motor is disposed in a housing to abut the housing. A first case is disposed in the housing. A second case is combined with the first case. A magnet and a rotor are disposed between the first and second cases. A shaft passes through the magnet, the rotor, and the second case, and is rotatably disposed on the first case. A weight is exposed by the second case, and connected to the shaft passing through the second case. The weight rotates along with the shaft to generate vibration. The vibration of the weight is transmitted to the housing.

18 Claims, 7 Drawing Sheets

VIBRATION MOTORS AND ELECTRONIC DEVICES UTILIZING THE SAME

BACKGROUND

The invention relates to vibration motors, and in particular, to vibration motors with exposed weights.

In general, an inevitable function for a mobile communication terminal is a call-receiving function. The call-receiving function indicates call-receiving most frequently via a melody mode for producing sound and a vibration mode for shaking the terminal. In other words, if a user previously selects a mode necessary for call-receiving, the selected mode operates at the time of call-receiving to allow the user to detect call-receiving.

In the above call-receiving modes, the vibration mode is generally used for allowing others to keep from noise in a place crowded with people. In general, the vibration mode drives a small-sized vibration motor to transfer a vibrating force to a housing of the terminal, by which the terminal vibrates.

Figure 1:
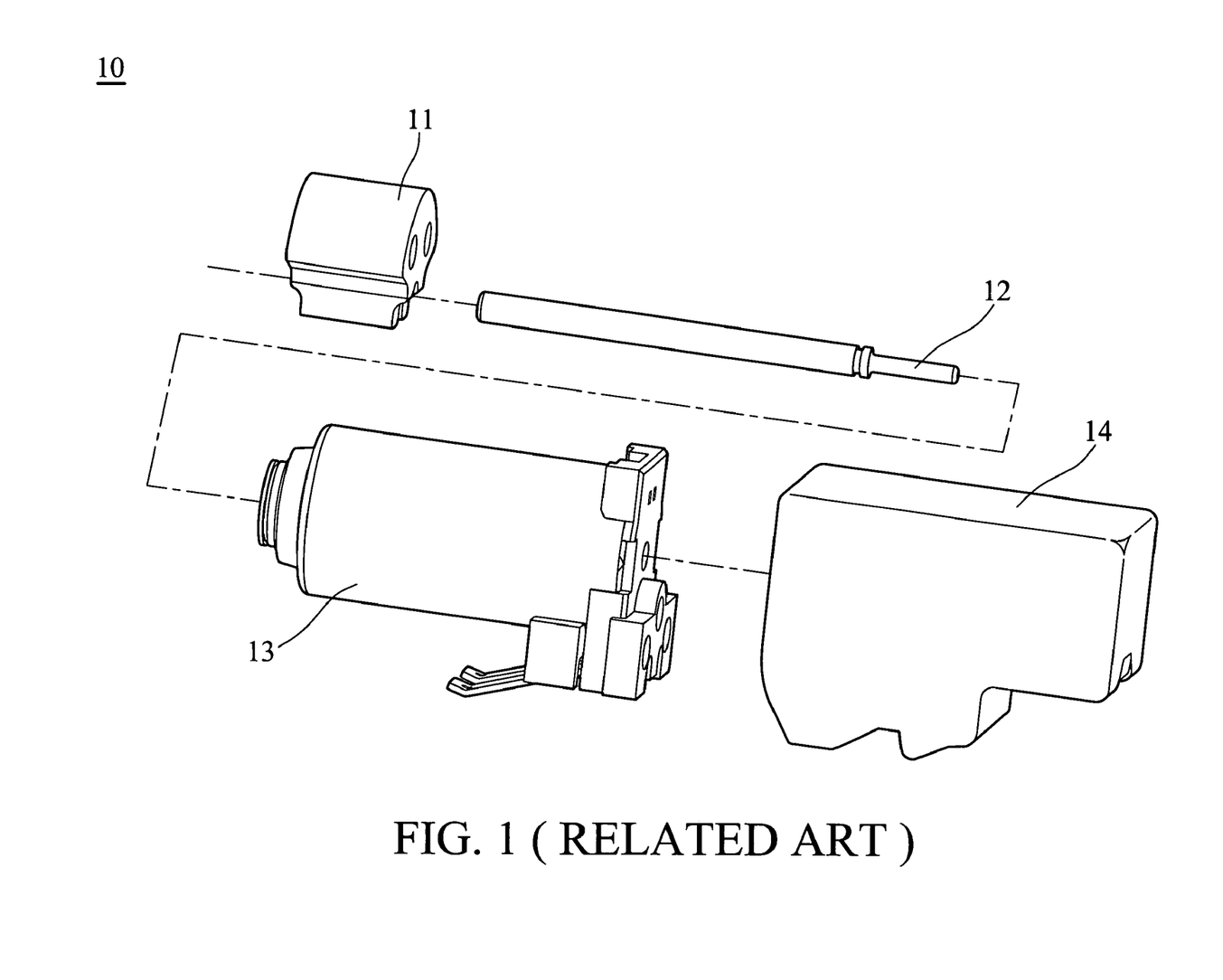
FIG. 1 is an exploded view of a conventional cylinder-type vibration motor.

In the meantime, a vibration mode conventionally in use is driven by a vibration motor which is additionally mounted inside the terminal. Examples of the most representative vibration motors include cylinder and pancake types FIG. 1 depicts a conventional cylinder-type vibration motor 10. The vibration motor 10 comprises a weight 11, a shaft 12, a body 13, and a rubber 14. Since the cylinder-type vibration motor requires larger space for installation, it may not be applied to a minimized mobile phone.

Figure 2:
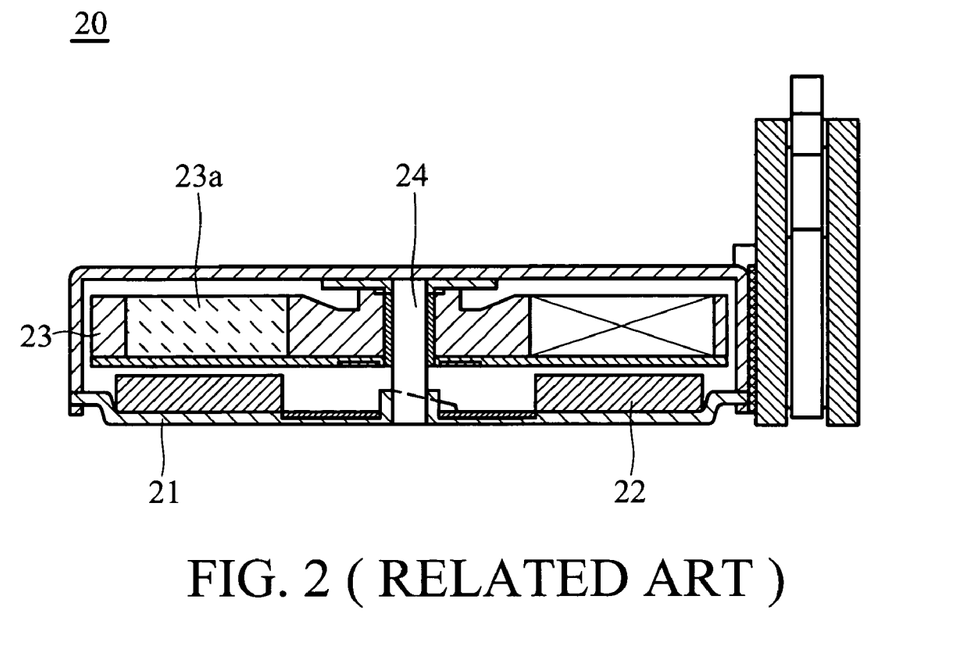
FIG. 2 is a cross section of a conventional pan cake-type vibration motor.

FIG. 2 depicts a conventional pancake-type vibration motor 20. The vibration motor 20 comprises a housing 21, a magnet 22, a rotor 23, a shaft 24, and a weight 23a disposed in the rotor 23. Since the size of the weight 23a is less, the vibrating force of the vibration motor 20 may be weaker.

SUMMARY

An electronic device is provided. An exemplary embodiment of an electronic device comprises a housing and a vibration motor disposed in the housing to abut the housing. The vibration motor comprises a first case, a second case, a magnet, a rotor, a shaft, and a weight. The first case is disposed in the housing. The second case is combined with the first case. The magnet is disposed between the first case and the second case. The rotor is disposed between the first case and the second case. The shaft passes through the magnet, the rotor, and the second case to be rotatably disposed on the first case. The weight connects the shaft, passing through the second case, to be exposed by the second case. The weight rotates along with the shaft, and generates vibration that transmits to the housing.

Another exemplary embodiment of an electronic device comprises a housing, a vibration motor, and an electromagnet. The vibration motor is disposed in the housing to abut the housing. The electromagnet is disposed in the housing around the vibration motor. The vibration motor comprises a first case, a second case, a magnet, a rotor, a shaft, and a second weight. The first case is disposed in the housing. The second case is combined with the first case. The magnet is disposed between the first case and the second case. The rotor is disposed between the first case and the second case, and comprises a first weight. The shaft passes through the magnet, the rotor, and the second case to be rotatably disposed on the first case. The second weight selectively connects the shaft, passing through the second case, to be exposed by the second case. The second weight rotates along with the shaft and generates vibration that transmits to the housing when the second weight is connected to the shaft. The electromagnet corresponds to the second weight to control the connection between the second weight and the shaft.

DESCRIPTION OF THE DRAWINGS

Vibration motors and electronic devices can be more fully understood by reading the subsequent detailed description and examples with references made to the accompanying drawings, wherein.

DETAILED DESCRIPTION

Figure 3:
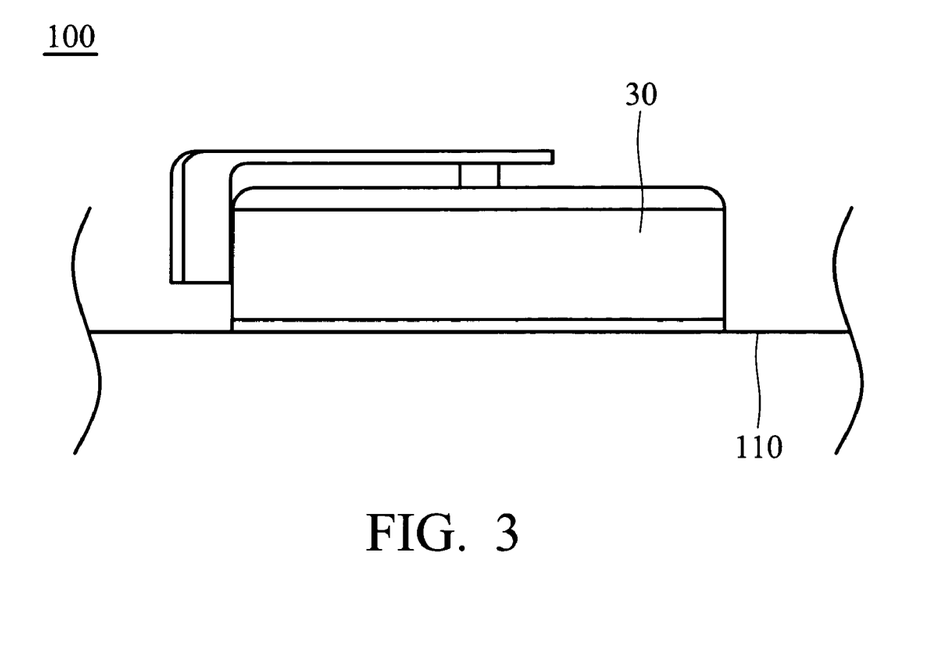
FIG. 3 is a schematic view of an embodiment of an electronic device.

FIG. 3 depicts an embodiment of an electronic device 100. The electronic device 100 comprises a housing 110 and a vibration motor 30. The vibration motor 30 is installed in the electronic device 100 via the housing 110. In FIG. 3, only the portion, abutting the vibration motor 30, of the housing 110 is shown.

The vibration motor 30 is disposed in the electronic device 100 to abut the housing 110. As shown in FIGS. 4a-4f, the vibration motor 30 comprises a first case 31, a second case 32, a magnet 33, a rotor 34, a shaft 35, a weight 36, and a brush 37. The first case 31 abuts the housing 110, and comprises a first circuit 311.

Figure 4A:
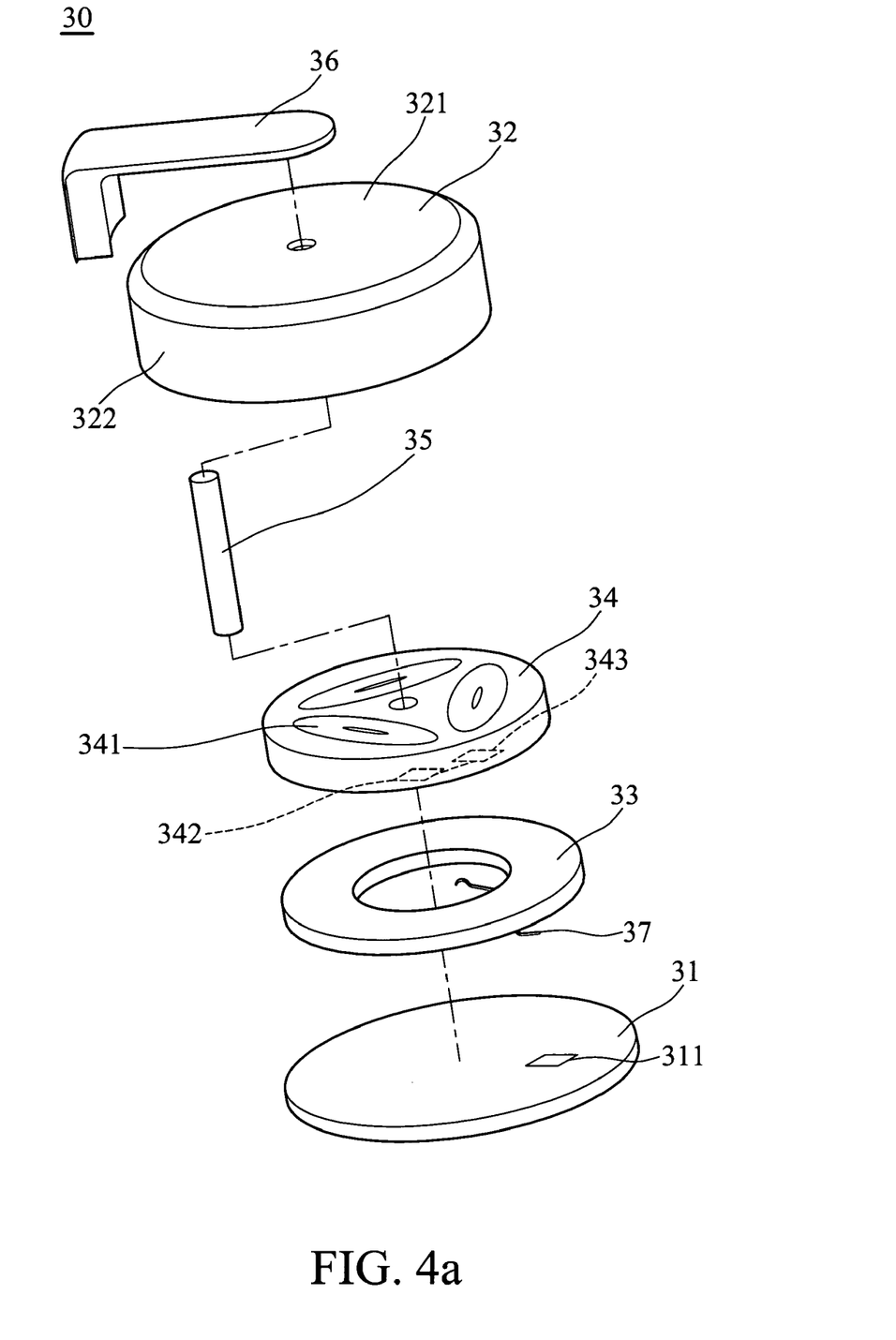
FIG. 4a is an exploded view of a vibration motor in FIG. 3.

The second case 32 is combined with the first case 31. As shown in FIG. 4a, the second case 32 comprises a first portion 321 and a second portion 322. The first portion 321 is a top portion of the second case 32 to face the first case 31. The second portion 322 is a circumference of the second base 32, and is located between the first portion 321 and the first case 31.

The magnet 33 is disposed between the first case 31 and the second case 32. The rotor 34 is disposed between lo the first case 31 and the second case 32, and located above the magnet 33. The rotor 34 comprises three coils 341, and a commutator 342 and a second circuit 343 at a surface facing the magnet 33. The commutator 342 electrically connects to the second circuit 343.

Figure 4B:
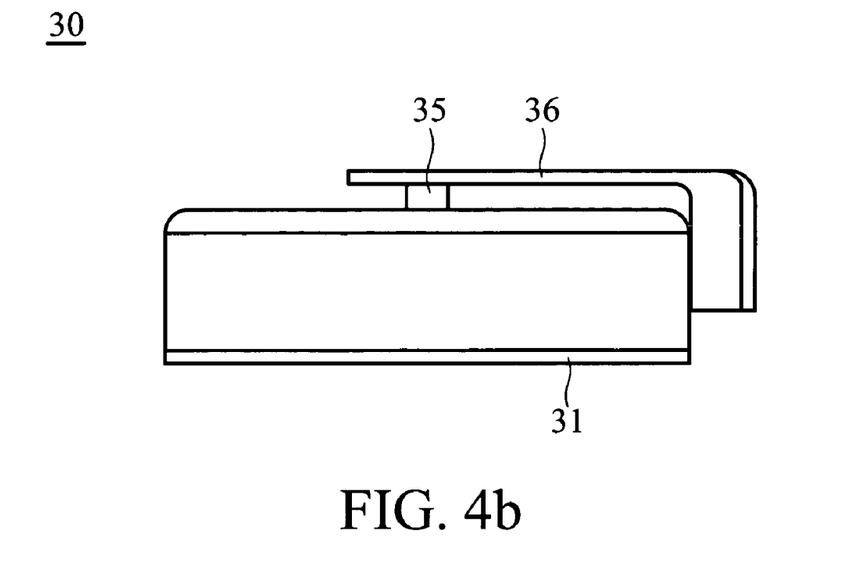
FIG. 4b is a rear view of the vibration motor in FIG. 3.
Figure 4C:
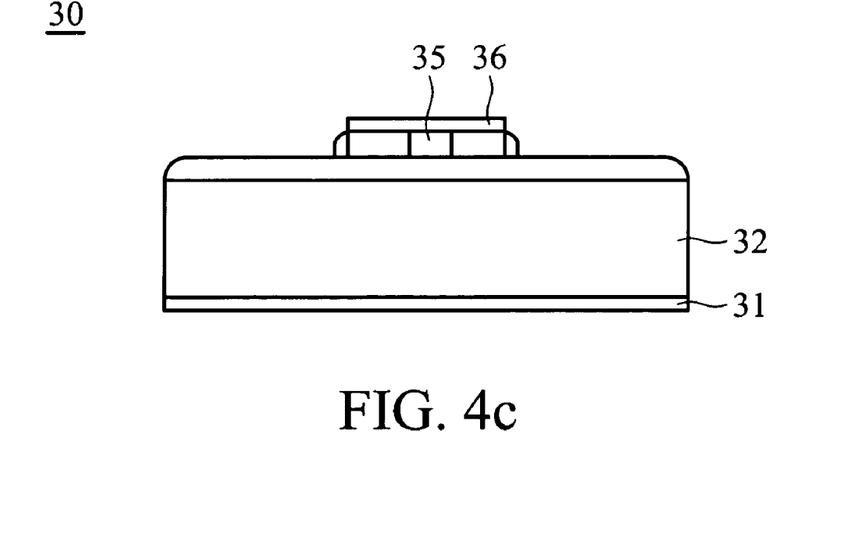
FIG. 4c is a right side view of the vibration motor in FIG. 3.
Figure 4D:
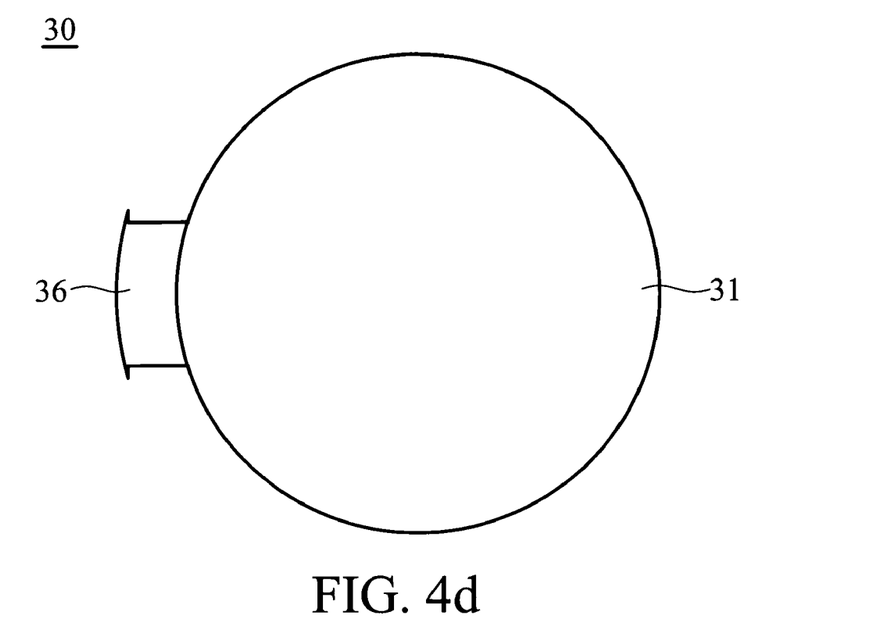
FIG. 4d is a top view of the vibration motor in FIG. 3.
Figure 4E:
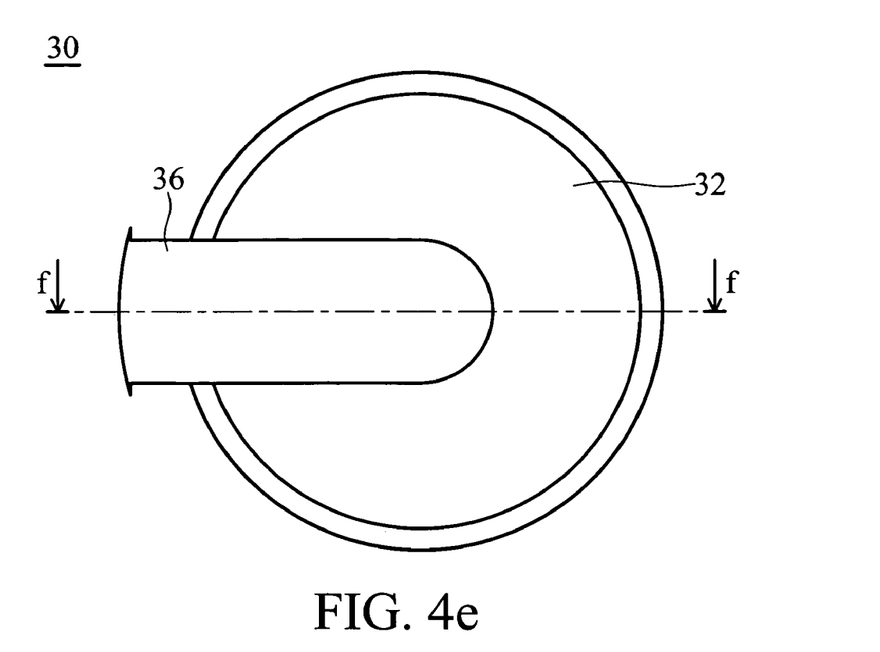
FIG. 4e is a bottom view of the vibration motor in FIG. 3.
Figure 4F:
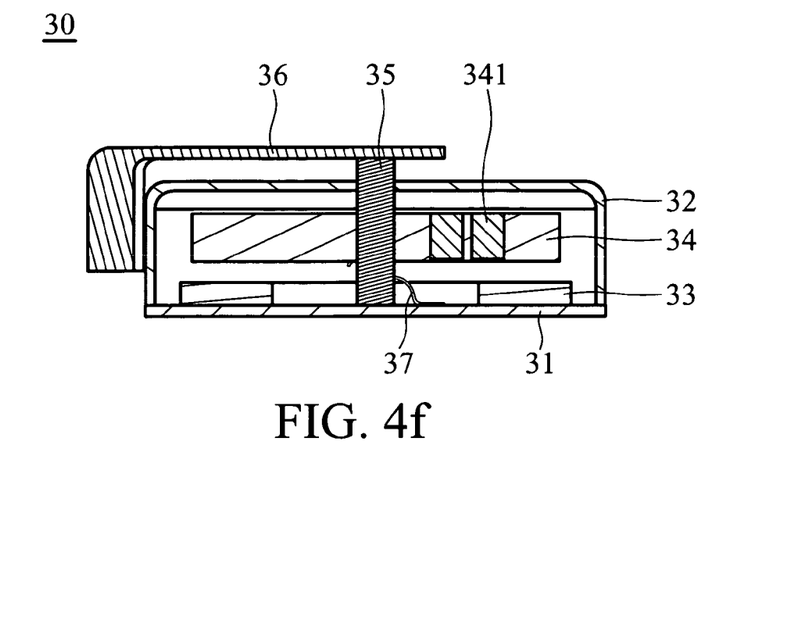
FIG. 4f is a cross section along a line f-f in FIG. 3.

The shaft 35 passes through the magnet 33, the rotor 34, and the second case 32 consecutively to be rotatably disposed on the first case 31. The weight 36 connects to the shaft 35, passing through the second case 32, to be exposed by the second case 32. The weight 36 rotates along with the shaft 35, and generates vibration that transmits to the housing 110 via the shaft 35 and the first case 31. As shown in FIG. 4b, the weight 36 is located outside the second case 32 to partially cover the first and second portions 321 and 322 of the second case 32. The weight 36 is asymmetrical.

The brush 37 electrically connects to the first circuit 311 of the first case 31, and electrically connects to the second circuit 343 of the rotor 34 via the commutator 342 of the rotor 34. That is, the first circuit 311 and the second circuit 343 are electrically connected to each other via the brush 37.

The electronic device 100 may be a mobile phone.

To actuate the vibration motor 30, the coils 341 are electrified by external power via the first circuit 311, the brush 37, the commutator 342, and the second circuit 343. Then, the coils 341 generate an electric field to attract and repel a magnetic field of the magnet 33 to rotate the rotor 34. When the rotor 34 is rotated, the weight 36 is also rotated via the shaft 35. Since the weight 36 is asymmetrical, the vibration motor 30 generates the vibration due to the rotation of the weight 36.

The vibration motor 30 may combine characteristics of the cylinder-type motor and the pancake-type motor. Specifically, the weight 36 of the vibration motor 34 is located outside of the first and second cases 31 and 32, thus increasing the rotary momentum of the weight 36. Furthermore, the weight may be heavier than that of the conventional pancake-type motor, thus enhancing vibration. Moreover, the height of the entire vibration motor 30 may be less than that of the cylinder-type motor.

Additionally, since the weight is not disposed on the rotor and is located outside the first and second cases, the space for the coil may be increased. As shown in FIG. 4a, the rotor 34 comprises three coils 341. Since the area of the coils is increased, the coils may be thinner while obtaining the same electric field as the conventional coil, thus decreasing the thickness of the entire vibration motor.

Figure 5:
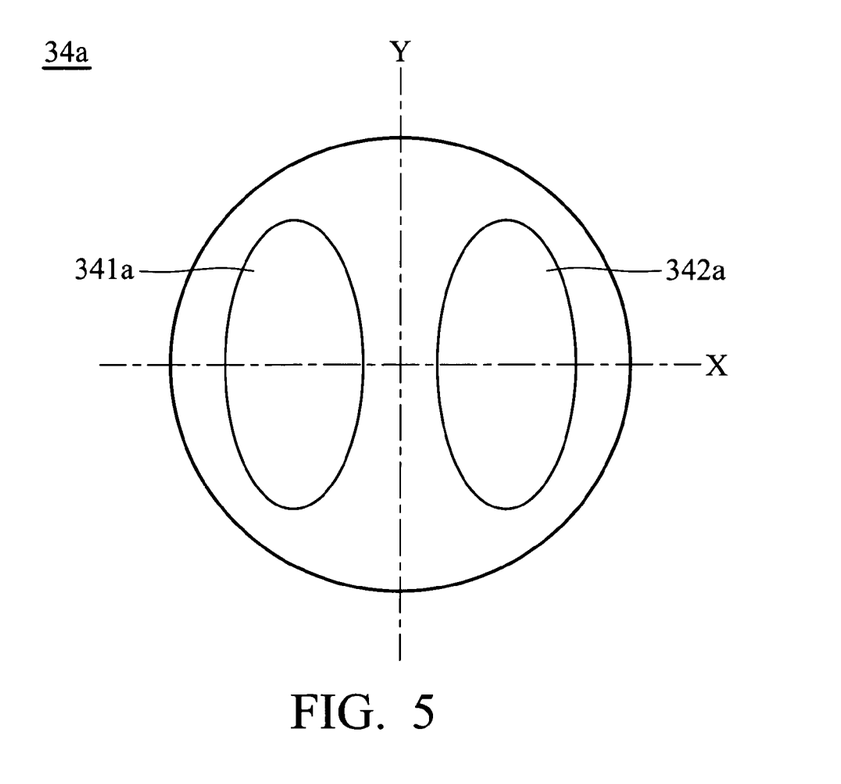
FIG. 5 is a schematic view of an embodiment of a rotor in FIG. 3.

While the number of the coils of this embodiment is three, it is not limited thereto, and may be two as shown in FIG. 5. FIG. 5 depicts another rotor 34a comprising a first coil 341a, a second coil 342a, a first axis Y, and a second axis X perpendicular to the first axis Y. The first and second coils 341a and 342a are symmetric with respect to the first axis Y. The first coil 341a is symmetric with respect to the second axis X, and the second coil 342a is symmetric with respect to the second axis X.

Figure 6A:
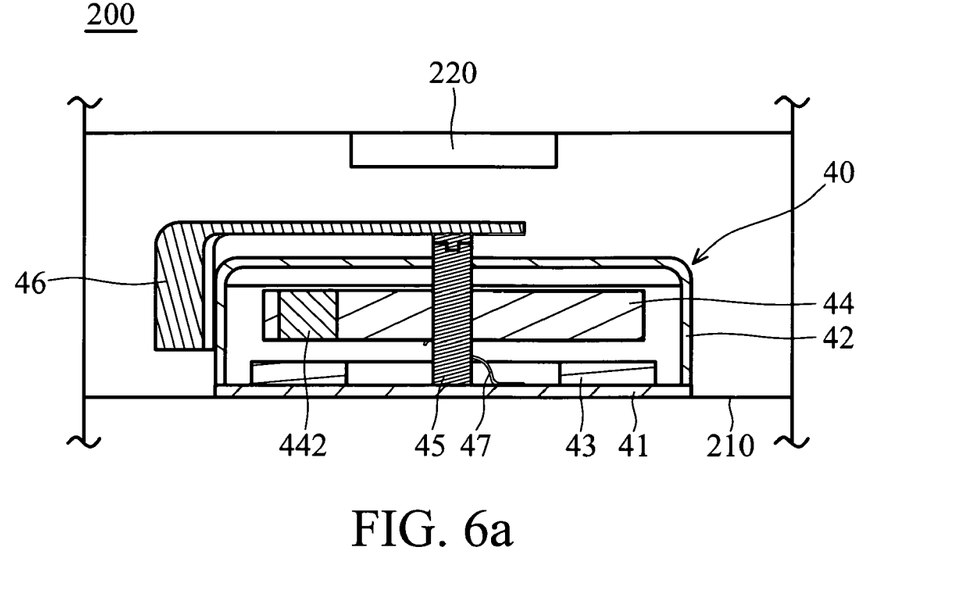
FIGS. 6a and 6b are schematic views of another embodiment of an electronic device.
Figure 6B:
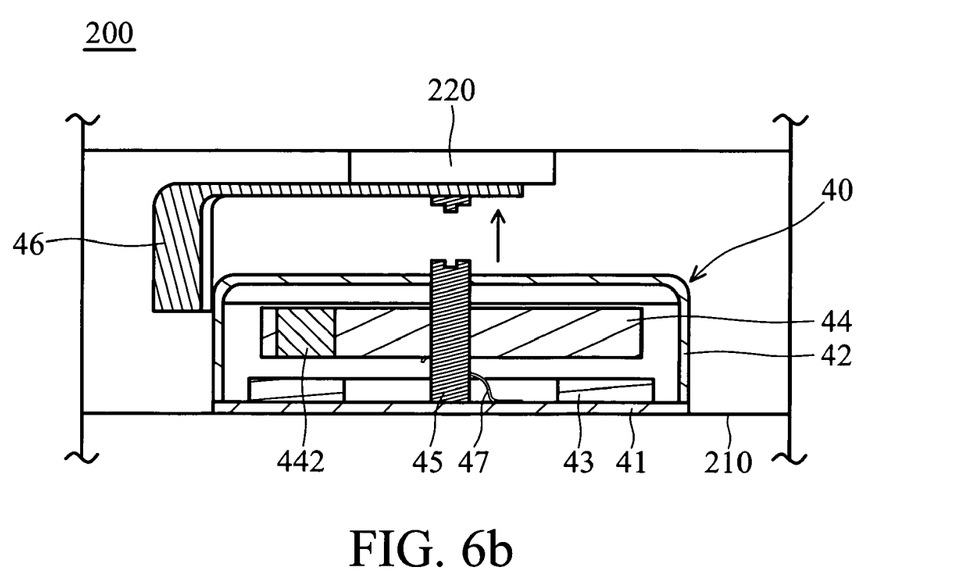

FIGS. 6a-6b are schematic views of another embodiment of an electronic device 200. The electronic device 200 comprises a housing 210, a vibration motor 40, and an electromagnet 220. The vibration motor 40 comprises a first case 41, a second case 42, a magnet 43, a rotor 44, a shaft 45, a second weight 46, and a brush 47. Since the first case 41, the second case 42, the magnet 43, the shaft 45, and the brush 47 are the same as those of the vibration motor 30 in FIG. 3, their description is omitted. Additionally, since the second weight 46 is the same as the weight 36 in FIG. 3, its description is also omitted.

The vibration motor 40 differs from the vibration motor 30 in that the rotor 44 comprises a first weight 442 and the electromagnet 220 is disposed in the housing 120.

Referring to FIGS. 6a and 6b, the electromagnet 220 is disposed in the housing 210 around the vibration motor 40, and corresponds to the second weight 46 to control the connection between the second weight 46 and the shaft 45. When the electromagnet. 220 is electrified, it attracts the second weight 46, causing separation from the shaft 45, as shown in FIG. 6b. At this time, the vibration, generated by the first weight 442, of the vibration motor 40 is transmitted to the housing 210. When the electromagnet 220 is not electrified, the second weight 46 connects to the shaft 45, as shown in FIG. 6a. At this time, the vibration, generated by the first and second weights 442 and 46, of the vibration motor 40 transmits the housing 210. Since the vibration motor 40 comprises two weights 442 and 46, vibration is enhanced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A vibration motor comprising:
   a first case;
   a second case combined with the first case;
   a magnet disposed between the first case and the second case;
   a rotor disposed between the first case and the second case, wherein the magnet is located between the rotor and the first case;
   a shaft passing through the magnet, the rotor, and the second case to be rotatably disposed on the first case;
   a weight connected to the shaft and located outside the second case, wherein the weight rotates along with the shaft to generate vibration.

2. The vibration motor as claimed in claim 1, wherein the second case comprises a first portion, facing the first case, and a second portion located between the first portion and the first case, and the weight partially covers the first and second portions.

3. The vibration motor as claimed in claim 1, wherein the rotor comprises a first coil, a second coil, a first axis, and a second axis perpendicular to the first axis, the first and second coils are symmetric with respect to the first axis, the first coil is symmetric with respect to the second axis, and the second coil is symmetric with respect to the second axis.

4. The vibration motor as claimed in claim 1, further comprising a first circuit disposed on the first case, a second circuit disposed on the rotor, and a brush electrically connecting the first and second circuits.

5. The vibration motor as claimed in claim 4, wherein the rotor comprises a commutator electrically connected to the brush so that the brushing is electrically connected to the second circuit via the commutator.

6. An electronic device comprising:
   a housing; and
   a vibration motor disposed in the housing to abut the housing;
   wherein the vibration motor comprises:
      a first case disposed in the housing;
      a second case combined with the first case;
      a magnet disposed between the first case and the second case;
      a rotor disposed between the first case and the second case, wherein the magnet is located between the rotor and the first case;
      a shaft passing through the magnet, the rotor, and the second case to be rotatably disposed on the first case; and
      a weight connected to the shaft and located outside the second case, wherein the weight rotates along with the shaft, and generates vibration transmitted to the housing.

7. The electronic device as claimed in claim 6, wherein the second case comprises a first portion, facing the first case, and a second portion located between the first portion and the first case, and the weight is located outside the second case to partially cover the first and second portions.

8. The electronic device as claimed in claim 6, wherein the first case abuts the housing so that the vibration of the weight is transmitted to the housing via the shaft and the first case.

9. The electronic device as claimed in claim 6, wherein the rotor comprises a first coil, a second coil, a first axis, and a second axis perpendicular to the first axis, the first and second coils are symmetric with respect to the first axis, the first coil is symmetric with respect to the second axis, and the second coil is symmetric with respect to the second axis.

10. The electronic device as claimed in claim 6, wherein the vibration motor further comprises a first circuit disposed on the first case, a second circuit disposed on the rotor, and a brush electrically connecting the first and second circuits; wherein the rotor comprises a commutator electrically connected to the brush so that the brush is electrically connected to the second circuit via the commutator.

11. The electronic device as claimed in claim 6, wherein the electronic device is a mobile phone.

12. An electronic device comprising:
    a housing; and
    a vibration motor disposed in the housing to abut the housing;
    wherein the vibration motor comprises:
        a first case disposed in the housing;
        a second case combined with the first case;
        a magnet disposed between the first case and the second case;
        a rotor disposed between the first case and the second case;
        a shaft passing through the magnet, the rotor, and the second case to be rotatably disposed on the first case; and
        a weight connected to the shaft and located outside the second case, wherein the weight rotates along with the shaft, and generates vibration transmitted to the housing;
    wherein the vibration motor further comprises a first circuit disposed on the first case, and a second circuit disposed on the rotor, and a brush electrically connecting the first and second circuits.

13. The electronic device as claimed in claim 12, wherein the second case comprises a first portion, facing the first case, and a second portion located between the first portion and the first case, and the weight is located outside the second case to partially cover the first and second portions.

14. The electronic device as claimed in claim 12, wherein the first case abuts the housing so that the vibration of the weight is transmitted to the housing via the shaft and the first case.

15. The electronic device as claimed in claim 12, wherein the rotor comprises a first coil, a second coil, a first axis, and a second axis perpendicular to the first axis, the first and second coils are symmetric with respect to the first axis, the first coil is symmetric with respect to the second axis, and the second coil is symmetric with respect to the second axis.

16. The electronic device as claimed in claim 12, wherein the rotor comprises a commutator electrically connected to the brush so that the brush is electrically connected to the second circuit via the commutator.

17. The electronic device as claimed in claim 12, wherein the magnet is located between the rotor and the first case.

18. The electronic device as claimed in claim 12, wherein the electronic device is a mobile phone.

* * * * *